E. E. HOWSON.
PROCESS OF EXTRACTION OF PRECIOUS METALS FROM THEIR CARRIER.
APPLICATION FILED APR. 14, 1913.
1,093,700.
Patented Apr. 21, 1914.
2 SHEETS—SHEET 1.
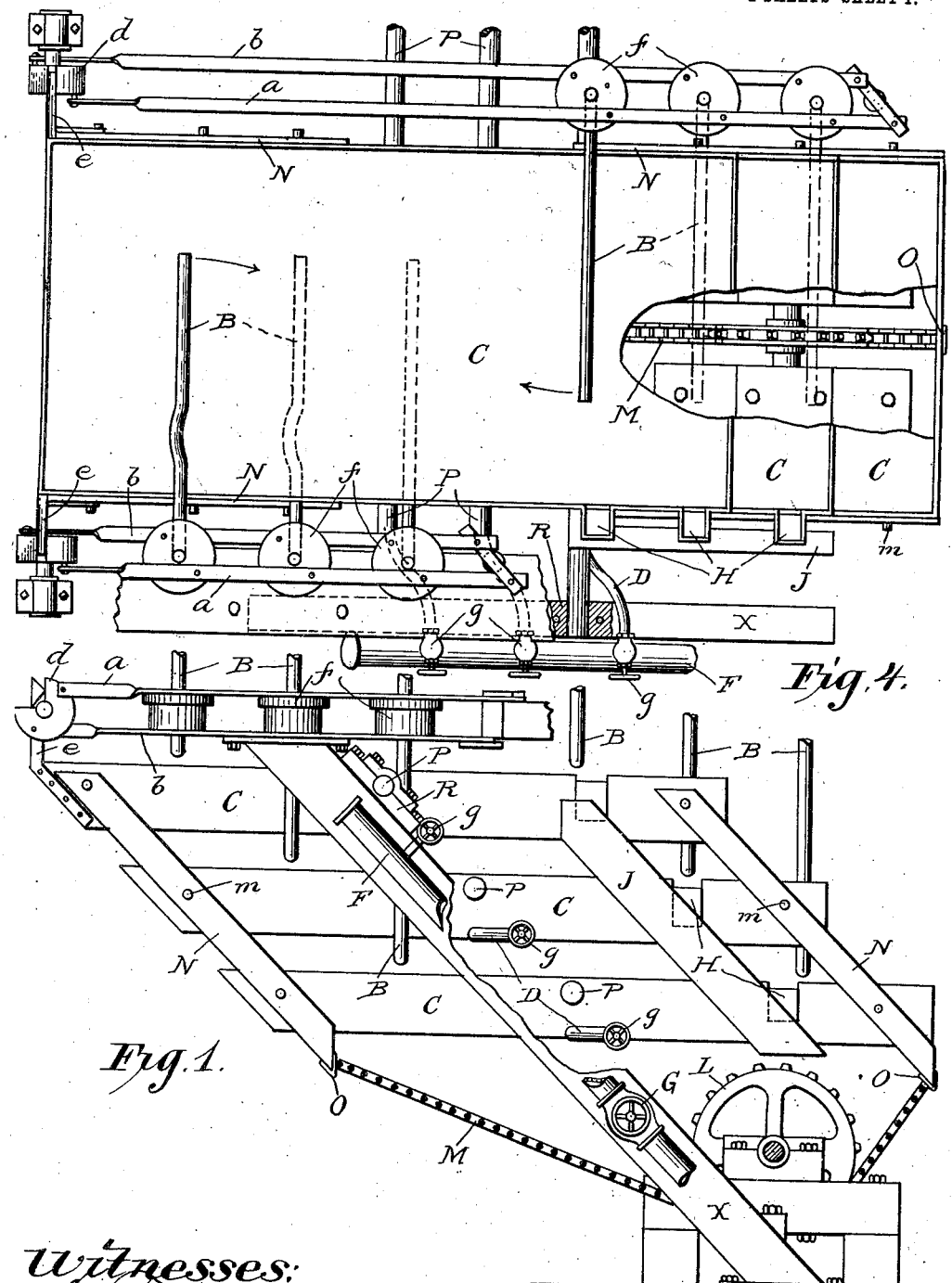

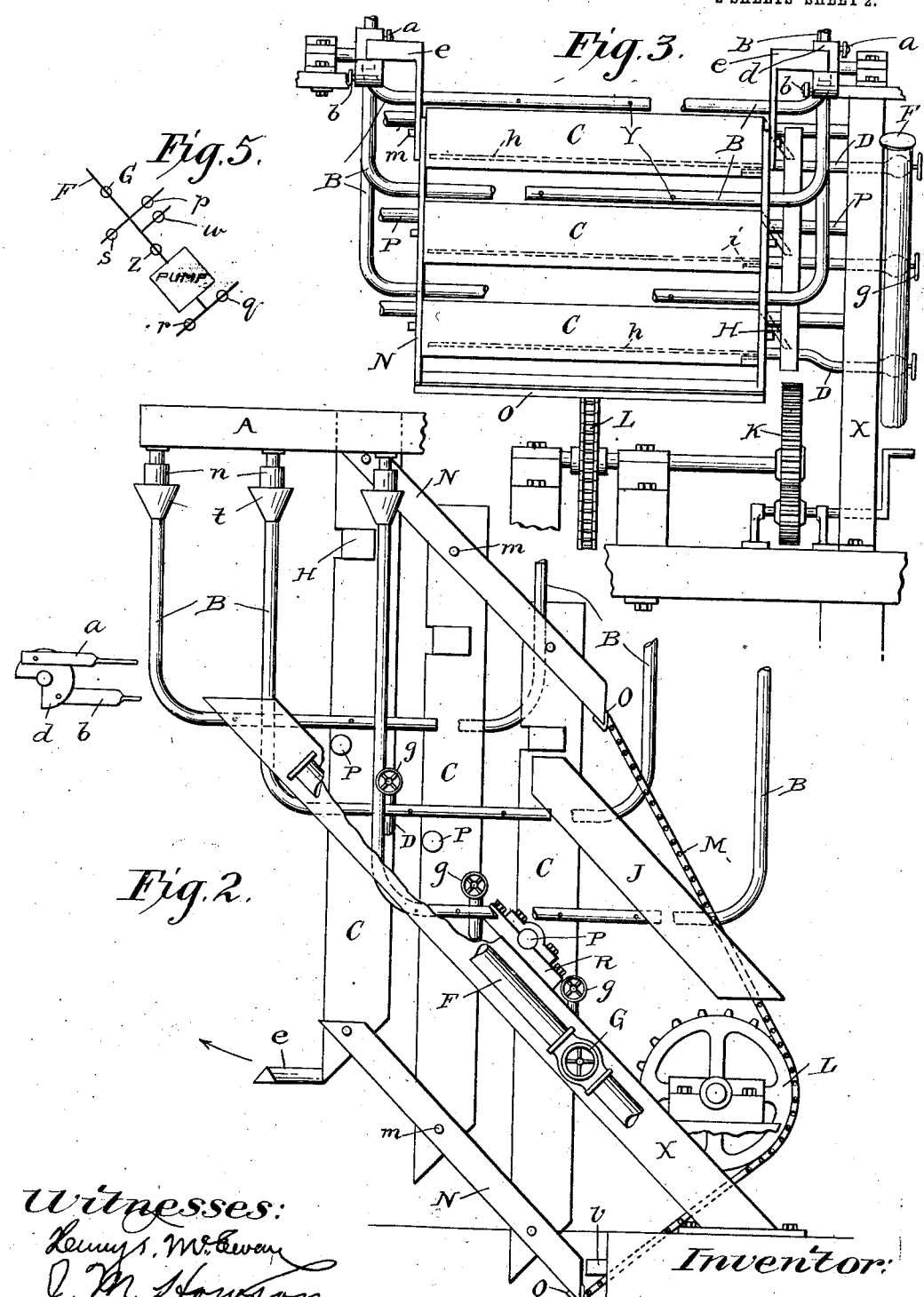

UNITED STATES PATENT OFFICE.

ELLIS EDGAR HOWSON, OF SALT LAKE CITY, UTAH.

PROCESS OF EXTRACTION OF PRECIOUS METALS FROM THEIR CARRIER.

1,093,700.  Specification of Letters Patent. Patented Apr. 21, 1914.

Application filed April 14, 1913. Serial No. 761,107.

*To all whom it may concern:*

Be it known that I, ELLIS EDGAR HOWSON, a citizen of the United States, residing at Salt Lake City, in the county of Salt Lake and State of Utah, have invented new and useful improvements in processes of extraction of precious metals from their carrier, such as crushed crude ore, tailings, concentrates, slime separated from sand, sand separated from slime, crude ore crushed in cyanid solution, and solution carrying gold or silver, or both, to which has been added a metal precipitant, of which the following is a specification.

This invention relates to a method of extraction of precious metals from their carrier, by means of a metal solvent and a metal precipitant, but more particularly to the manner of manipulating the metal carrier, and has for its object a quick method of, first, simultaneously conveying a metal carrier to a plurality of receptacles to be treated as a whole; second, expelling surplus solution while continuing the filling of receptacles; third, simultaneously giving the material the necessary agitation and aeration; fourth, forming a residuum; and fifth, expelling residuum. These manipulations are made possible by; first, forming a shallow layer of or simultaneously forming a plurality of layers of material, which the agitating currents and solutions can more easily penetrate than through thicker bodies of same; and second, the method of disengaging the residuum. I attain these results in the following manner and with the means illustrated in the accompanying drawing.

Figure 1 is a side view of a plurality of horizontally positioned and parallel filter contained receptacles, said receptacles in a position for receiving and treating a metal carrier. Fig. 2 is a side view of the vertical position the receptacles assume when disengaging the residuum. Fig. 3 is a front view of Fig. 1. Fig. 4 is a top view Fig. 1. Fig. 5 shows diagrammatically the connections to and from the several solution receptacles and from the agitating current of warm air.

Similar letters refer to similar parts throughout the several views.

In the method of treating a pulverized metal carrier direct, from a pulverizing medium, concentrates, tailings after concentration or amalgamation or both, tailings dumps, slime separated from sand or sand separated from slime, the material flows to launders A and simultaneously down through a plurality of openings $n$, which fit loosely in the openings $t$, flowing through the feed pipes B, and discharging at $y$ into the several receptacles C, simultaneously. While the material is being conveyed to the receptacles C, the surplus solution is being expelled downwardly through the filtering medium $h$, Fig. 3, and out the outlets $i$, Fig. 3, through the flexible passageways D, through the valves $g$, and into the main pipe F, and thence through the main outlet valve G, Fig. 1, but should the receptacles C overflow, it passes through the overflow channels H to the general overflow outlet J. The main outlet valve G connects at $p$, Fig. 5, with the metal solvent tank, at $q$ with the surplus solution sump, at $r$, with the metal carrying solution sump, at $s$, with the agitating current, at $w$ with the solution tank, and at Z to a pump, Fig. 5.

When sufficient material has been conveyed to the receptacles C to form the required layer, the material is diverted from A, and the necessary amount of metal solvent flows into the receptacles C through $q$ and $i$ below the filtering medium $h$, then the layers are sufficiently agitated, simultaneously with the current of warm air through $s$ and $i$ and up through $h$, thereby insuring an even distribution of same. When sufficiently agitated the current is discontinued and the metal carrying solution is downwardly drawn off through $h$ and $i$ to the metal carrying solution sump $r$. If desired agitation is again carried on after a required amount of solution is added to the layer J, then discontinued and the solution expelled downwardly through $h$, and then the layers of residue are simultaneously disengaged by an abrupt change from a horizontal to a vertical position aided by a slight jar the receptacles receive when the upright supports N come in contact with the rubber bumper V, Fig. 2. The feed pipes B are also simultaneously swung to the outside of the receptacles C Fig. 2, when the tilting of the receptacles takes place. The tilting is accomplished by the action of the sprocket chain M, on the cross piece O Figs. 1, 2 and 3, by means of the sprocket wheel L and the gear and pinion K. The chain M connects at O to the upright supports N, they in turn are axially attached at M, to the receptacles C, which are suspended by the shafts P, in the bearing boxes R, on the I-beams X.

The feed pipes B are simultaneously swung out, when the receptacles C have moved down the first small fraction of a quadrant, when the ratchet wheel $d$, by means of the finger $e$, which is attached to the head end of the uppermost receptacle C, and moves with it, is pulled down, thereby turning an angle of 90°, the ratchet wheel pulls on the rod $a$, and pushes on rod $b$, $a$ and $b$, being axially connected opposite to each other on the ratchet wheel $d$, also on the circular bearings $f$, through which the feed pipes B pass and are rigidly connected, the feed pipes B swing an angle of 90°. When the receptacles C, assume a horizontal position from the vertical Fig. 2, the finger $e$ pushes the ratchet wheel $d$ back, the ratchet wheel in turn pushes on $a$ and pulls on $b$ which places the feed pipes B in their original position Figs. 1, 2, and 4.

In the modified method of treating a solution, carrying precious metals to which has been added the metal precipitant the desired quantity of the carrier is run into a receptacle C, or simultaneously into a plurality of receptacles C, then after agitation the metal impoverished solution is downwardly drawn off through the filtering medium $h$, then through $i$ and G, thence to the surplus solution sump $r$. The metallic precipitate remaining on the top of the filtering medium or mediums $h$ is dried by a warm current from beneath the filtering medium, and then the dried residuum is disengaged from the receptacles C, as above.

I know that prior to my invention, extraction of precious metals by means of metal solvents and metal precipitants was and is now being accomplished, but I am not aware that it was or is being done in the same manner or by the means I have herein fully described.

I claim:

1. The method of extracting precious metals, which comprises forming a relatively thin layer of a solid bearing solution, downwardly removing the solution during the formation of the layer, supplying a wash solution and agitating the mass with a warm current of air, downwardly removing the wash solution, applying a drying current of air from beneath and disengaging the layer of solids.

2. The method of extracting precious metals, which comprises forming a relatively thin layer of a solid bearing solution, downwardly removing the solution during the formation of the layer, supplying a solvent solution and agitating the mass with a warm current of air, downwardly removing the solvent solution, supplying a wash solution, agitating the mass with a warm current of air, downwardly removing the wash solution and disengaging the layer of solids.

ELLIS EDGAR HOWSON.

Witnesses:
 JAS. M. HOWSON,
 HENRY T. MCEWAN.